(12) United States Patent
Kendall

(10) Patent No.: US 11,794,376 B2
(45) Date of Patent: Oct. 24, 2023

(54) APPLICATION OF GAP FILLERS DURING LAYUP OF CHARGES OF COMPOSITE MATERIAL

(71) Applicant: The Boeing Company, Chicago, IL (US)

(72) Inventor: James R. Kendall, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/532,028

(22) Filed: Nov. 22, 2021

(65) Prior Publication Data

US 2022/0314494 A1 Oct. 6, 2022

Related U.S. Application Data

(60) Provisional application No. 63/168,529, filed on Mar. 31, 2021.

(51) Int. Cl.
B29B 11/16 (2006.01)
B64F 5/10 (2017.01)
B29C 65/00 (2006.01)
B29C 70/52 (2006.01)
B29L 31/30 (2006.01)
B29K 307/04 (2006.01)

(52) U.S. Cl.
CPC ............ B29B 11/16 (2013.01); B29C 66/721 (2013.01); B29C 70/521 (2013.01); B29C 70/526 (2013.01); B29C 70/527 (2013.01); B64F 5/10 (2017.01); B29K 2307/04 (2013.01); B29L 2031/3082 (2013.01)

(58) Field of Classification Search
CPC ... B29C 70/462; B29C 70/526; B29C 70/446; B29D 99/0014
See application file for complete search history.

(56) References Cited

U.S. PATENT DOCUMENTS 1,856,319 A * 5/1932 Cooper ................. B29C 51/087
425/436 RM
2,581,222 A * 1/1952 Evans ....................... B31F 1/08
264/339

(Continued)

FOREIGN PATENT DOCUMENTS

EP 3677412 A1 7/2020

OTHER PUBLICATIONS

European Search Report; Application 22151737.8; dated Jun. 24, 2022.

Primary Examiner — Michael W Hotchkiss
(74) Attorney, Agent, or Firm — Duft & Bornsen, PC

(57) ABSTRACT

Systems and methods are provided for shaping flat charges. One embodiment is a forming system for shaping a flat charge. The forming system includes female dies that are elongate and are configured to hold the flat charge, and a male die that is elongate and is configured to press into the flat charge between the female dies to form the flat charge while the flat charge is supported, the male die includes notches that extend along a length of the male die and are dimensioned to retain gap fillers of the flat charge at width-wise locations of the flat charge corresponding to corners at the female dies while the flat charge is formed.

20 Claims, 18 Drawing Sheets

(56) References Cited

U.S. PATENT DOCUMENTS

| | | | | |
|---|---|---|---|---|
| 4,302,499 | A * | 11/1981 | Grisch | B29C 70/00 442/268 |
| 4,304,751 | A * | 12/1981 | Li | B29C 43/34 425/193 |
| 4,718,153 | A * | 1/1988 | Armitage | B29C 44/569 29/91.1 |
| 4,952,366 | A * | 8/1990 | Gelin | B29C 31/085 264/137 |
| 4,964,935 | A * | 10/1990 | Biggs | B29C 43/003 428/113 |
| 5,066,351 | A * | 11/1991 | Knoll | B29C 43/04 264/237 |
| 5,188,787 | A * | 2/1993 | King | B29C 45/14778 425/398 |
| 5,200,133 | A * | 4/1993 | Dieul | B29C 70/48 264/102 |
| 5,609,805 | A * | 3/1997 | Finck | B29C 70/48 264/257 |
| 5,714,179 | A * | 2/1998 | Goodridge | B29C 70/44 425/DIG. 44 |
| 5,800,759 | A * | 9/1998 | Yamazaki | B29C 45/14008 425/149 |
| 5,804,292 | A * | 9/1998 | Ishitoya | B29C 43/18 156/196 |
| 6,716,023 | B2 * | 4/2004 | Yoshimura | B29C 63/025 425/408 |
| 7,118,370 | B2 * | 10/2006 | Willden | B29C 70/541 425/389 |
| 7,527,759 | B2 * | 5/2009 | Lee | B29C 70/541 264/319 |
| 7,655,168 | B2 * | 2/2010 | Jones | B29C 70/44 425/417 |
| 8,257,823 | B2 * | 9/2012 | Yamasaki | B29C 70/545 428/218 |
| 8,465,613 | B2 * | 6/2013 | Rotter | B29C 70/462 264/296 |
| 8,557,165 | B2 | 10/2013 | Jones et al. | |
| 8,632,330 | B2 * | 1/2014 | Jones | B29C 70/44 425/398 |
| 8,721,830 | B2 * | 5/2014 | Kurtz | B29C 70/545 264/339 |
| 9,511,550 | B2 * | 12/2016 | Mine | B29C 43/52 |
| 9,573,298 | B2 * | 2/2017 | Topping | B29C 70/48 |
| 9,649,817 | B2 * | 5/2017 | Robins | B29C 43/203 |
| 10,022,919 | B2 * | 7/2018 | Johnson | B29C 70/523 |
| 10,160,166 | B2 * | 12/2018 | Ono | B29C 70/302 |
| 10,293,524 | B2 * | 5/2019 | Kitayama | B29C 43/021 |
| 10,328,660 | B2 * | 6/2019 | Yamashita | B32B 3/28 |
| 10,369,740 | B2 * | 8/2019 | Chapman | B29C 70/541 |
| 10,377,091 | B2 * | 8/2019 | Carlson | B29C 33/68 |
| 10,654,229 | B2 * | 5/2020 | Coxon | B29C 70/56 |
| 10,766,212 | B2 | 9/2020 | Kendall et al. | |
| 11,059,235 | B2 * | 7/2021 | Kendall | B29C 31/08 |
| 11,214,020 | B2 * | 1/2022 | Matlack | B29C 33/02 |
| 11,396,143 | B2 * | 7/2022 | Kendall | B29C 70/345 |
| 11,518,121 | B2 * | 12/2022 | Saini | B29D 99/0014 |
| 2006/0141190 | A1 * | 6/2006 | Sieben | B29C 66/54 428/36.1 |
| 2008/0014453 | A1 * | 1/2008 | Levesque | B32B 27/12 264/510 |
| 2009/0320292 | A1 * | 12/2009 | Brennan | B29C 70/46 29/897.2 |
| 2013/0256951 | A1 * | 10/2013 | Buehlmeyer | F28D 21/001 264/320 |
| 2014/0103585 | A1 * | 4/2014 | Coxon | B29C 70/56 425/389 |
| 2018/0021988 | A1 * | 1/2018 | Oda | B29C 43/361 264/255 |
| 2018/0370162 | A1 * | 12/2018 | Eyssell | B32B 27/08 |
| 2019/0255747 | A1 * | 8/2019 | Pignard | B29C 66/723 |
| 2020/0215768 | A1 * | 7/2020 | Rifay | B29C 70/443 |
| 2020/0231267 | A1 | 7/2020 | Rotter et al. | |

* cited by examiner

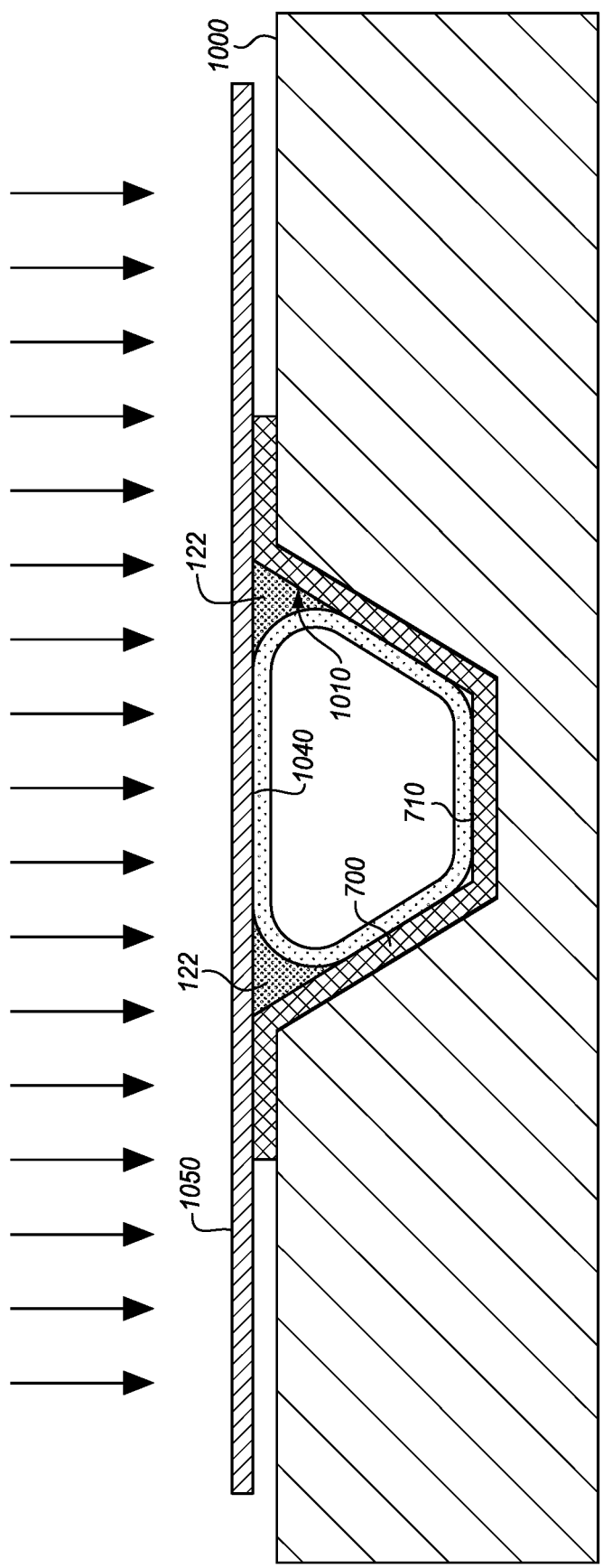

APPLICATION OF GAP FILLERS DURING LAYUP OF CHARGES OF COMPOSITE MATERIAL

RELATED APPLICATIONS

This non-provisional patent application claims priority to U.S. Provisional Patent Application No. 63/168,529, filed on Mar. 31, 2021.

TECHNICAL FIELD

The following disclosure relates to the field of fabrication, and in particular, to fabrication of structural components for an aircraft.

BACKGROUND

Multi-layer laminates of constituent material (e.g., Carbon Fiber Reinforced Polymer (CFRP)) may be formed into any of a variety of shapes for curing into a composite part. Composite parts may be used as structural components for aircraft. For example, a composite part may be implemented as a frame or stringer of an airframe of an aircraft.

When composite parts are utilized as structural components, gaps at internal corners of the composite parts may be filled with gap fillers in order to enhance structural strength. For example, after a preform for a stringer of an aircraft has been shaped and placed into a kitting tray, a gap filler may be applied along a length of the preform at a location where the preform will form an internal corner when united with a skin of the aircraft. Unfortunately, such placement techniques are performed manually and are substantially labor intensive, particularly for stringers that extend for tens of feet. Thus, a great deal of time at the factory floor is spent placing and aligning gap fillers with corresponding preforms.

Therefore, it would be desirable to have a method and apparatus that take into account at least some of the issues discussed above, as well as other possible issues.

SUMMARY

Embodiments described herein provide systems and techniques which are capable of automatically placing gap fillers for composite parts onto flat charges prior to the shaping of those flat charges into preforms. This provides a technical benefit by enhancing the ease of application of the gap fillers. This enhancement is enabled by the use of dies which are specially shaped to accommodate the presence of the gap fillers. Hence, shaping of the preforms by these dies does not overly compress or misshape the gap fillers. Furthermore, the techniques described herein facilitate adhering gap fillers to a flat charge or preform, without relying on pressure normally applied by a vacuum bag during compaction processes.

One embodiment is a forming system for shaping a flat charge. The forming system includes female dies that are elongate and are configured to hold the flat charge, and a male die that is elongate and is configured to press into the flat charge between the female dies to form the flat charge while the flat charge is supported. The male die includes notches that extend along a length of the male die and are dimensioned to retain gap fillers of the flat charge at widthwise locations of the flat charge corresponding to corners at the female dies while the flat charge is formed.

A further embodiment is a method for shaping a flat charge. The method includes disposing female dies that are elongate and are configured to hold the flat charge at a forming system, placing the flat charge at the female dies, supporting the flat charge at the female dies, pressing a male die that is elongate into the flat charge between the female dies to form the flat charge while the flat charge is supported, and retaining gap fillers of the flat charge within notches that extend along a length of the male die, at widthwise locations of the flat charge corresponding to corners at the female dies, while the flat charge is formed into a preform.

A further embodiment is a system for fabricating a structural member. The system includes a laminator configured to lay up a flat charge comprising layers of composite material, and a robot arm configured to dispense a gap filler along the flat charge, at a widthwise location corresponding to a corner of a female die dimensioned to form the flat charge.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 11 depicts a preform prepared for hardening in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform may be aligned parallel with each other, but different layers exhibit different fiber orientations in order to increase the strength of the resulting composite part along different dimensions. Furthermore, some layers may comprise woven fabric made from fibers. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
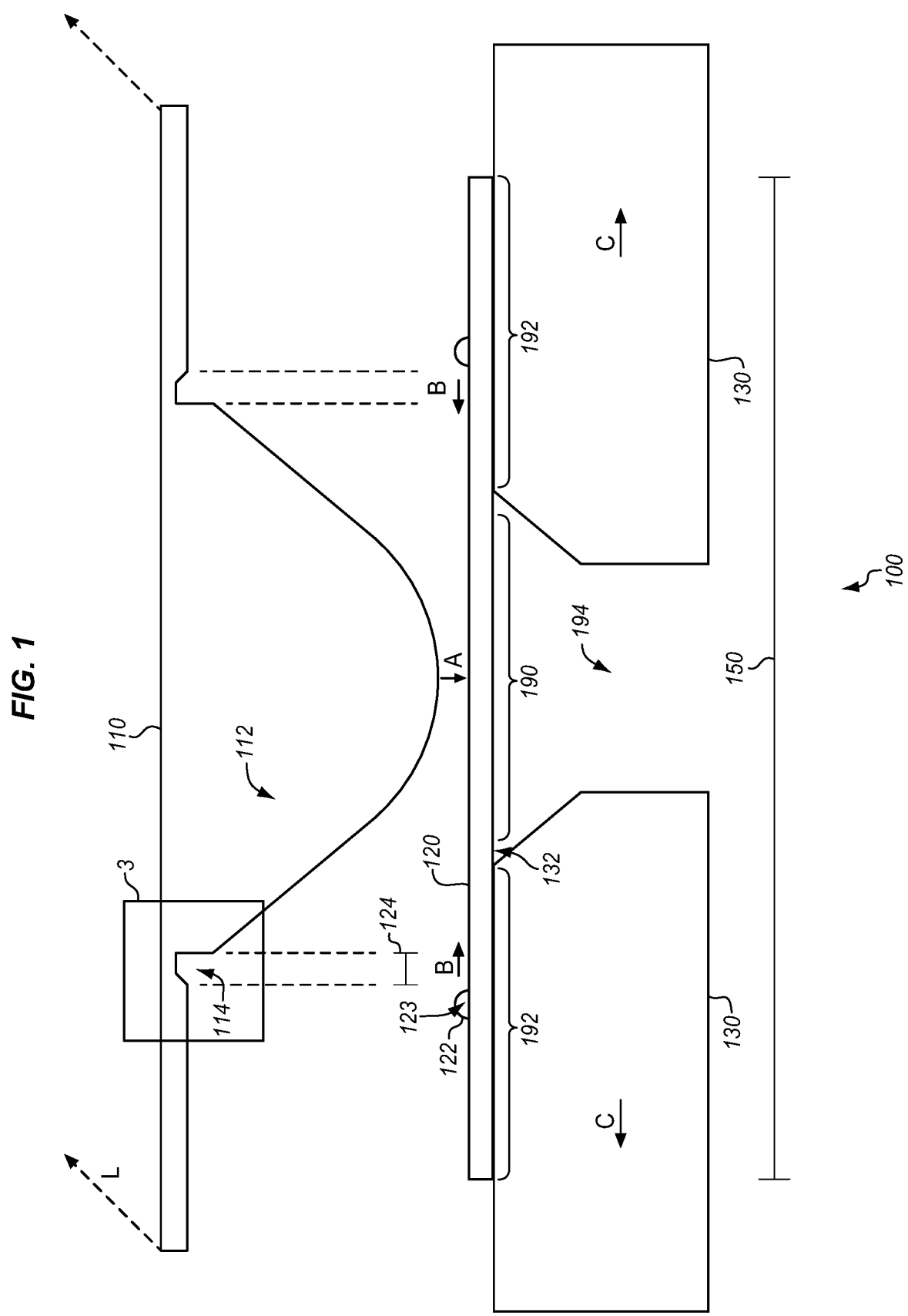
FIG. 1 illustrates a forming system that accommodates gap fillers in an illustrative embodiment.

FIG. 1 illustrates a forming system 100 that accommodates gap fillers 122 in an illustrative embodiment. Forming system 100 comprises any system, component, or device that is configured to shape a flat charge 120 into a preform 700 (FIG. 7) for a composite part via the operation of one or more male dies 110 that are elongate (i.e., extending into the page), and female dies 130 that are elongate, along a length of the flat charge 120 (i.e., into the page).

In this embodiment, forming system 100 has been enhanced to include notches 114 at the body 112 of each male die 110. The notches 114 accommodate the presence of gap fillers 122 that comprise curable resin 123. Specifically, the notches 114 extend along the length (L) of the male die 110 (i.e., into the page), and are dimensioned to receive, retain, shape, and/or adhere the gap fillers 122 of the flat charge 120 at widthwise locations 124 along a width 150 of the flat charge 120 during forming of the flat charge 120 into a preform 700. Specifically, during shaping of the flat charge 120, gap fillers 122 slide into widthwise locations 124 due to the flat charge 120 itself moving relative to the male die 110.

Briefly, although this process is described in more detail below with reference to FIGS. 4-9, male die 110 as shown in FIG. 1 shapes the flat charge 120 by moving downward (in the direction of arrow A) to engage the flat charge 120 and then push the engaged portion (as shown, the central portion 190) toward and into a space 194 between female dies 130. As such, the flat charge 120 deforms to exhibit a cross-sectional shape corresponding to that of the male die 110. During this deformation, the male die 110 continues to progress downward, and side portions 192 of the flat charge 120 are drawn inward (in the direction of arrows B), so that eventually the gap fillers 122, which are disposed on the side portions 192, engage and are received in notches 114. Simultaneously, the intended final shape of the flat charge 120 is stabilized by means of the female dies 130, which are urged away from each other (in the direction of arrows C) when the male die 110 pushes the engaged portion of the flat charge 120 into the space 194 between them. Also, after shaping of the flat charge 120, the widthwise locations 124 correspond with corners 132 of the female dies 130. In this embodiment, each notch 114 will bridge one of the corners 132 of the female dies 130, and/or each of the widthwise locations 124 will become a corner 1010 (FIG. 10A) of a preform 700 (FIG. 7) after forming of the flat charge 120 has completed.

Using this process, after forming has been completed, the gap fillers 122 remain adhered without being overly compressed or misshapen by the forming, and are disposed at the location where an internal corner will be formed when the preform 700 has been united with a skin preform 1050 (FIG. 11) for co-curing. This means that gap fillers 122 may be beneficially applied to the flat charge 120 without concerns of unintended distortion or damage to the gap fillers 122 during forming processes. Because disposing the gap fillers 122 onto a flat charge 120 is substantially more straightforward than disposing the gap fillers 122 onto a preform 700 (FIG. 7), substantial savings of time are achieved. Furthermore, this is accomplished without losses in accuracy of placement of the gap fillers 122.

Illustrative details of the operation of forming system 100 will be discussed with regard to FIG. 2. Assume, for this embodiment, that flat charge 120 has been laid-up, and that gap fillers 122 have been disposed at widthwise locations 124 along a width of the flat charge 120, across an entire length of the flat charge 120.

Figure 2:
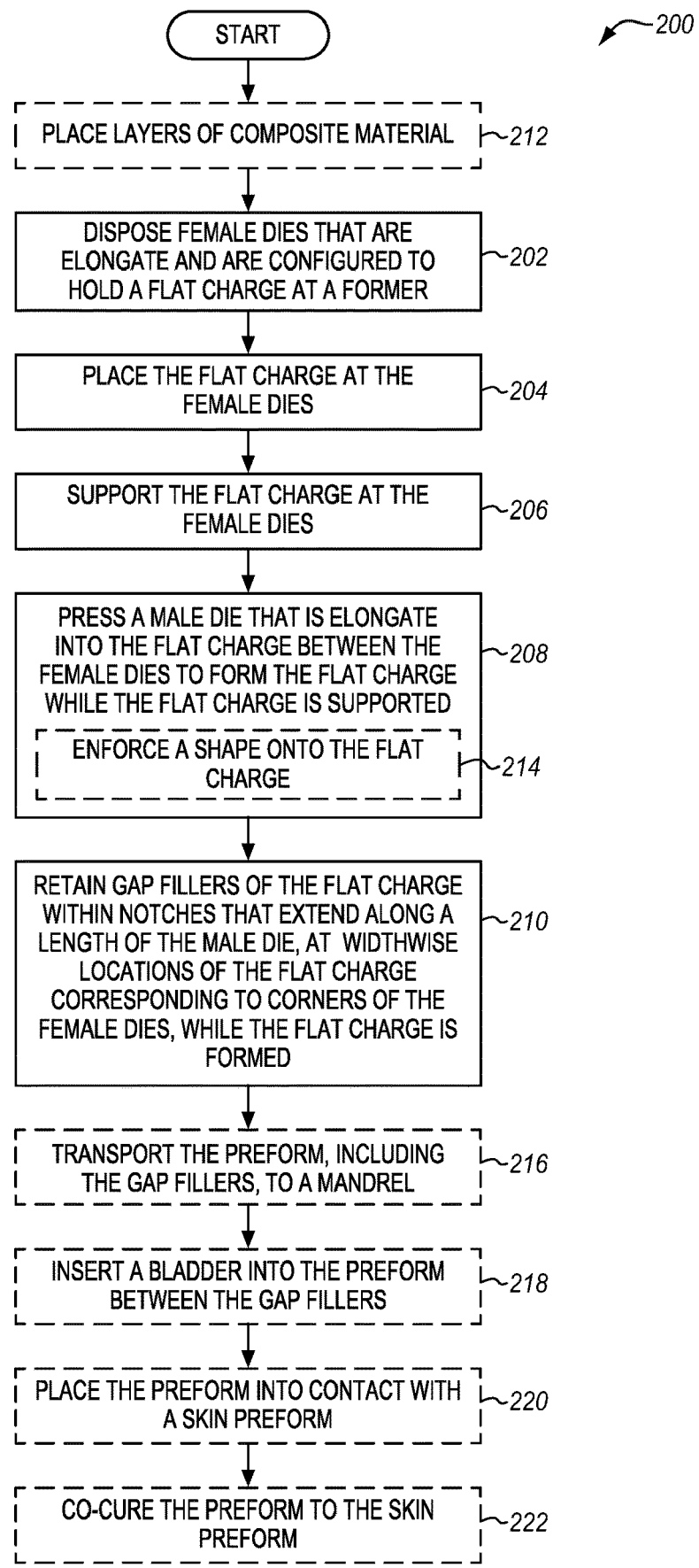
FIG. 2 is a flowchart illustrating a method for operating a forming system that accommodates gap fillers in an illustrative embodiment.

FIG. 2 is a flowchart illustrating a method 200 for operating a forming system that accommodates gap fillers 122 in an illustrative embodiment. The steps of method 200 are described with reference to forming system 100 of FIG. 1, but those skilled in the art will appreciate that method 200 may be performed in other systems. The steps of the flowcharts described herein are not all inclusive and may include other steps not shown. The steps described herein may also be performed in an alternative order.

Method 200 optionally comprises placing, at 212, layers 1240 (FIG. 12) of composite material 1242 (FIG. 12) into position to form a flat charge 120. Such a layup operation may be performed at a separate fabrication cell than a cell used for forming, and/or trimming the flat charge 120.

Method 200 further includes disposing, at 202, female dies 130 that are configured to hold the flat charge 120 at a former (e.g., a punch former). In one embodiment, this comprises placing female dies 130 that include suction ports 410 (FIG. 4) for retaining the flat charge 120, or female dies 130 that are configured collaborate with an assembly to hold the flat charge 120 in a pinch grip.

Method 200 further includes placing, at 204, the flat charge 120 at the female dies 130. In one embodiment, this comprises picking and placing the flat charge 120, along its entire length (e.g., for tens of feet), onto a series of female dies 130 arranged (e.g., end to end) along a length of the flat charge 120, such that additional female dies 130 are encountered by traveling into the page of FIG. 1.

Method 200 additionally involves supporting, at 206, the flat charge 120 at the female dies 130. In one embodiment, this comprises operating suction ports 410 (FIG. 4) at the female dies 130 to apply suction that holds the flat charge 120 in place (i.e., by pulling suction through lower die surfaces to grip the flat charge 120). In a further embodiment, this comprises forming a pinch grip between the female dies 130 and feet 620 (FIG. 6) of a former, using flange blocks, etc., or placing the flat charge 120 atop the female dies 130 such that gravity does not deform the flat charge 120.

The method 200 also includes pressing, at 208, a male die 110 into the flat charge 120 between the female dies 130. This operation forms the flat charge 120 while the flat charge 120 is supported in place at the female dies 130. In one embodiment, this comprises optionally enforcing, at 214, a shape 710 (FIG. 7) (e.g., a U-shape, trapezoidal shape, or omega shape) onto the flat charge 120. Thus, a type of lash forming is performed upon the flat charge 120 to create a desired cross-sectional shape. In one embodiment, during this process a common die is utilized for flat charges 120, with variations in desired gage (e.g., according to different stringer designs) being accommodated by a lower die being free to slide further in areas of higher gage.

In a further embodiment, during this process, different ones of female dies 130 and male dies 110 arrayed along a length of the flat charge 120 may be vertically or horizontally positioned to enforce contouring onto the flat charge 120 along its length. In this manner, a resulting preform 700 may accommodate joggles, shifts, or other shape changes along its length in order to conform with other structural components after it is cured and then assembled into a portion of an airframe.

Figure 10A:
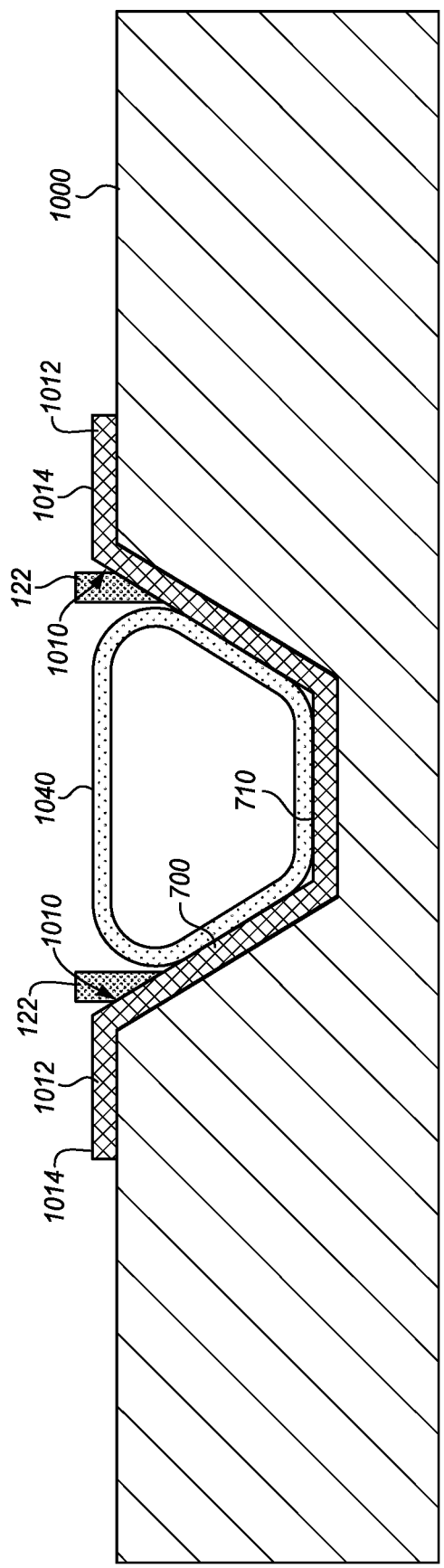
FIG. 10A depicts a preform disposed at a mandrel in an illustrative embodiment.

A further operation of the method 200 includes retaining, at 210, the gap fillers 122 of the flat charge 120 within notches 114 of the male die 110 at widthwise locations 124 of the flat charge 120 that correspond to corners 132 of the female dies 130, while the flat charge 120 is being formed into a preform 700. This operation prevents over-compression and/or misshaping of the gap fillers 122 while preserving their widthwise locations 124 and adhering the gap fillers 122 into place. Hence, the gap fillers 122 are unharmed by the forming process, although they may be suitably compressed to ensure adhesion of the gap fillers 122 to the flat charge 120. In one embodiment, this is performed by providing slightly less space in a notch 114 than occupied by a gap filler 122, in order to ensure squeeze out. In another embodiment, this is performed by lifting the gap filler 122 and the notch 114 slightly higher along a radius of a corner 132 to ensure that the gap filler 122 sits proud at a preform 700 after forming. That is, the gap filler 122 projects/extends beyond flanges 1012 of the resulting preform 700, as shown in FIG. 10A. This means that the gap fillers 122 are in position to fill a corner 1010 (FIG. 11) that will be formed when the preform 700 is prepared for curing.

In a further embodiment, method 200 further optionally comprises transporting, at 216, the preform 700 (including the gap fillers 122), to a mandrel 1000 (FIG. 10A) or kitting location, and inserting, at 216, a bladder 1040 (FIG. 10A) into the preform 700, between the gap fillers 122. The preform 700 is then optionally placed, at 220, into contact with a skin preform 1050 (FIG. 11). The preform 700 may then be co-cured, at 222, to the skin preform 1050.

Figure 6:
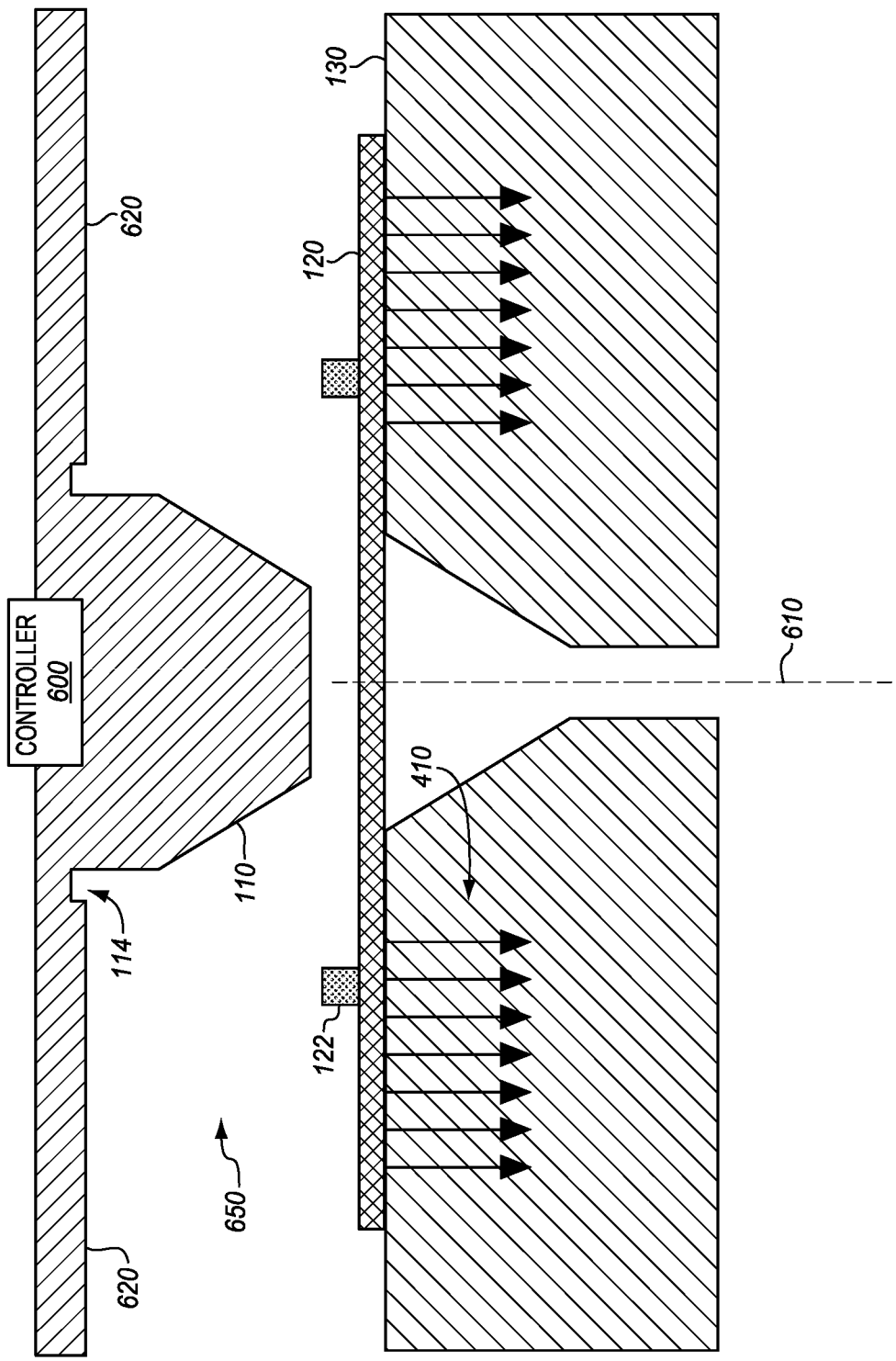

Method 200 provides a technical benefit over prior techniques, because it enables gap fillers 122 to be applied before a preform 700 has been formed from a flat charge 120. Application of the gap fillers 122 to the flat charge 120 is a straightforward process because the flat charge 120, being flat, accommodates the positioning of the gap fillers 122 at precisely chosen widthwise locations 124 relative to its centerline 610 (FIG. 6).

Figure 3:
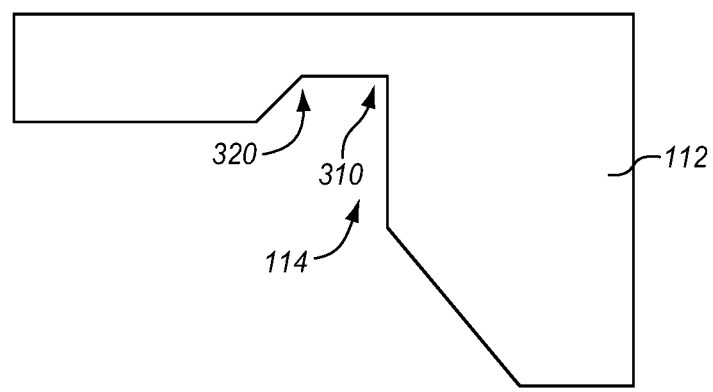
FIG. 3 is a zoomed in view of a notch that accommodates a gap filler in an illustrative embodiment.

FIG. 3 is a zoomed in view of a notch 114 that accommodates a gap filler 122 in an illustrative embodiment. In this embodiment, it can be seen that internal corners 310 and 320 are within the notch 114. The internal corners 310 and 320 are dimensioned to be at least ninety degrees. This ensures that when body 112 of the male die 110 is lifted away from the female dies 130 to release the preform 700 (e.g., in combination with one or more layers of release film), the gap fillers 122 are not retained or pulled away from the preform 700. Instead, the gap fillers 122 slide away from the notches 114 as the male die 110 rises, and the gap fillers 122 are not lifted or otherwise moved in an undesirable fashion.

Figure 4:
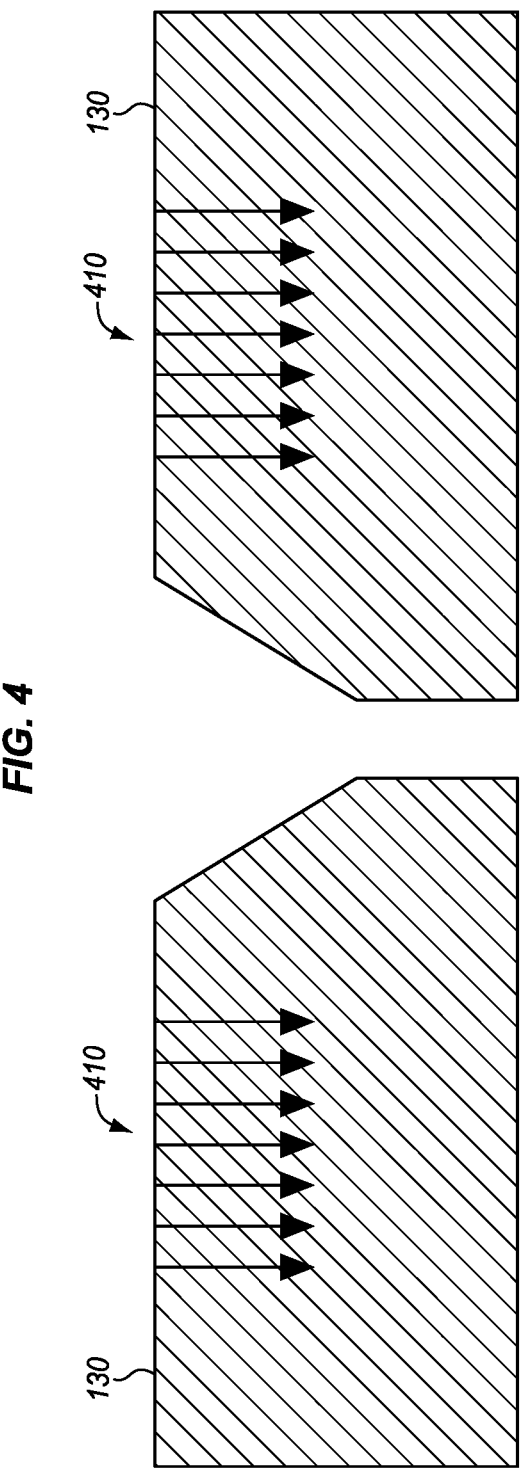
FIGS. 4-9 depict operation of a forming system to shape a flat charge into a preform while accommodating gap fillers in an illustrative embodiment.

FIGS. 4-9 somewhat schematically depict operation of a forming system 650 to shape a flat charge 120 into a preform 700 while accommodating gap fillers 122 in an illustrative embodiment. In FIG. 4, female dies 130 are positioned to receive a flat charge 120. In this embodiment, a small gap exists between the female dies 130, and the female dies 130 each have a mechanism to resist motion, such as a spring, pneumatic system, servo, exterior bladders, or other components. This ensures that the female dies 130 push back when displaced.

Figure 5:
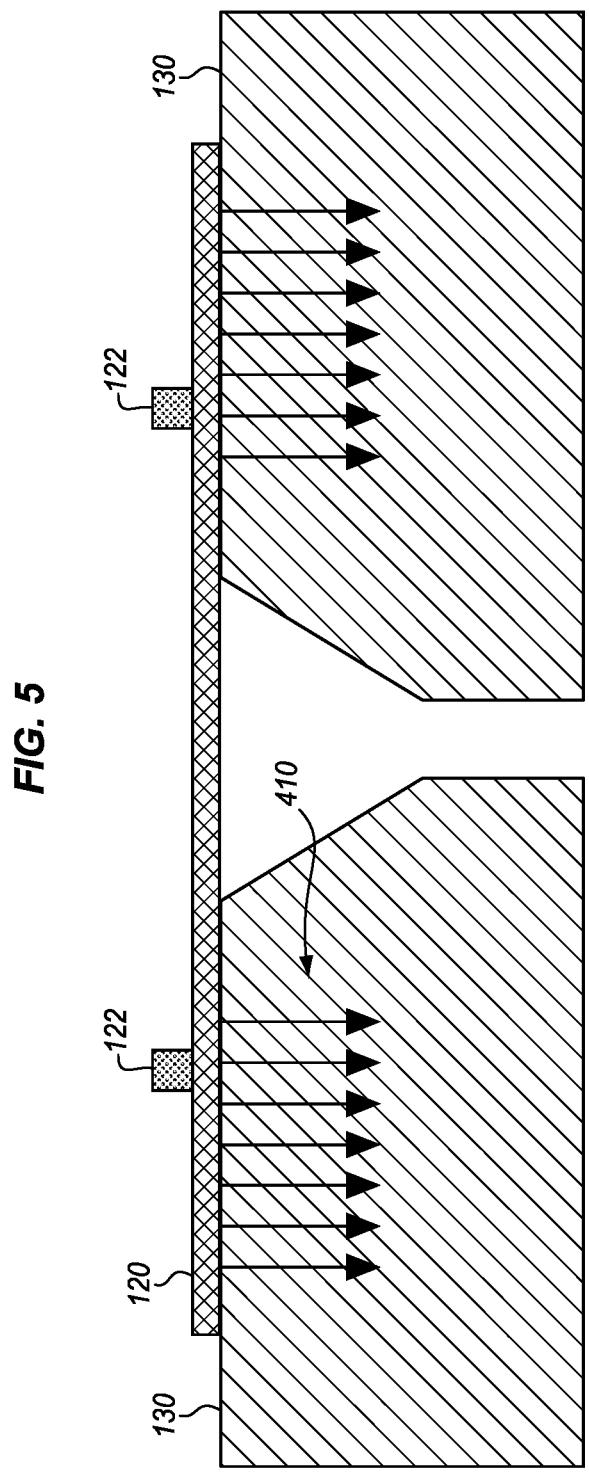

In this embodiment, the female dies 130 each include suction ports 410 for retaining a flat charge 120 during forming. In FIG. 5, a flat charge 120, upon which gap fillers 122 have been disposed, is placed atop the female dies 130, in particular atop the suction ports 410. In one embodiment, the female dies 130 pull vacuum through a layer of Vyon (e.g., a porous high density polyethylene) (not shown). This vacuum is the source of frictional load on the flat charge 120 that keeps the flat charge 120 in tension through the forming process.

In FIG. 6, a forming system 650 (e.g., a punch former) is aligned based on instructions from a controller 600 (e.g., in accordance with a Numerical Control (NC) program) above the flat charge 120. Controller 600 is implemented as custom circuitry, as a hardware processor executing programmed instructions stored in memory, or some combination thereof. While depicted as a part of forming system 650, controller 600 is separated from male die 110 of the forming system 650 in many embodiments.

During the alignment process, a centerline (not shown) of the male die 110 at the forming system 650 may be aligned with a centerline 610 of the flat charge 120. The male die 110 includes notches 114 dimensioned to receive the gap fillers 122. The forming system 650 further includes feet 620 which in this embodiment are configured to pinch or otherwise hold the flat charge 120 in position, when acting in tandem with female dies 130.

The female dies 130 apply suction via the suction ports 410, in order to hold/anchor the flat charge 120 in place during forming of the flat charge 120. However, in further embodiments the suction ports 410 are implemented at feet 620, or are foregone entirely. For example, feet 620 may pinch the flat charge 120 against the female dies 130 with sufficient strength to anchor the flat charge 120. For example, the feet 620 may be independently actuated relative to male die 110, or may be operated together therewith.

Figure 7:
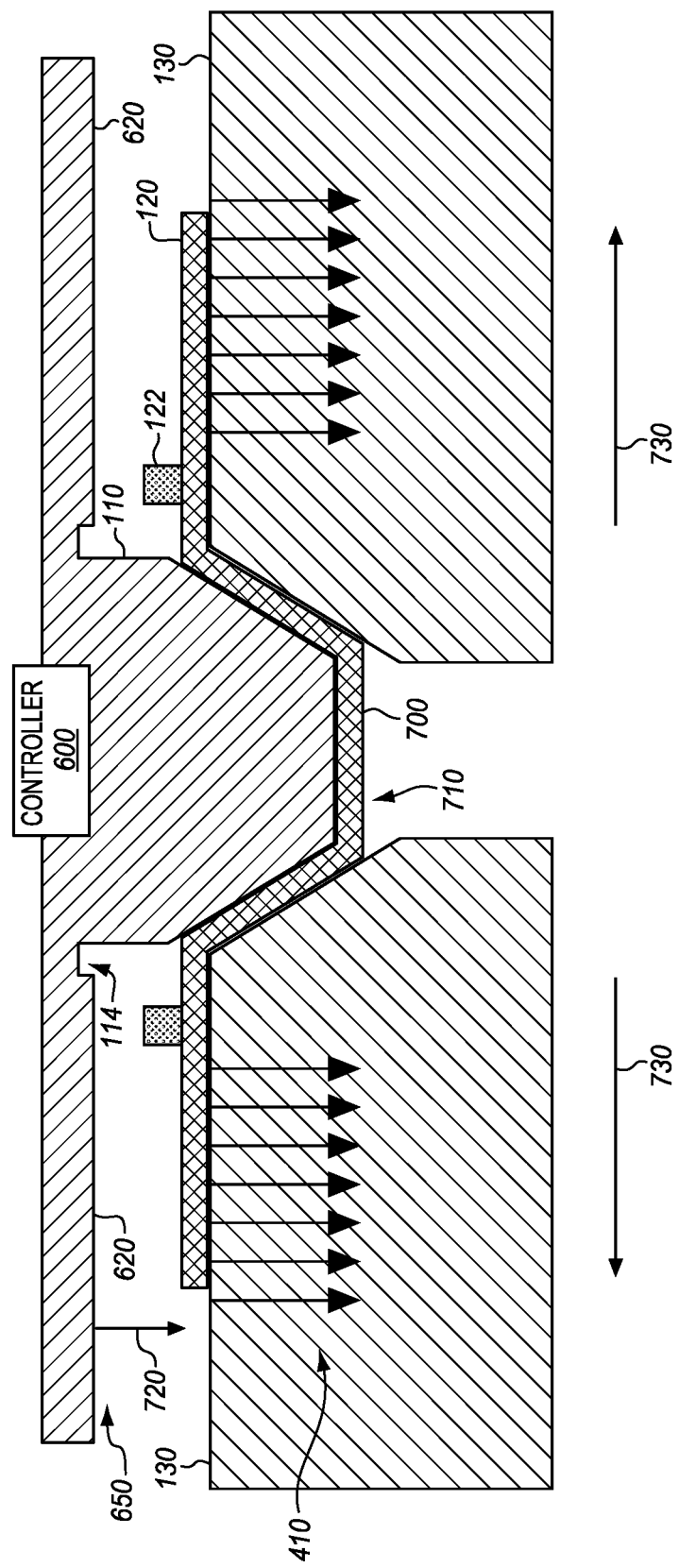

In FIG. 7, the flat charge 120 is supported in place, and the male die 110 is driven in direction 720 in accordance with instructions from controller 600 to start forming of the flat charge 120. The forming operation drives apart the female dies 130 in directions 730. The male die 110 and the female dies 130 are configured to form the flat charge 120 into a shape 710, such as a U shape, trapezoid shape, or omega shape. This operation, similar to lash forming, results in a preform 700 exhibiting the shape 710.

As the male die 110 plunges, the vacuum supplied by the suction ports 410 resists and creates tension in the preform 700. This holds the preform 700 tight across its length. During the process, frictional forces create internal shear stress at the preform 700. Thus, the arc lengths of inner and outer plies within the preform 700 offset each other. Eventually the male die 110 plunges until the preform 700 is pinched between the male die 110 and the female dies 130. The female dies 130 are therefore pushed open by the lowering male die 110 and this is resisted by the motion resistance mechanism in the female dies 130. Resulting shear forces in the preform 700 create slippage in between the plies allowing for shaping to complete without the creation of wrinkles.

Figure 8:
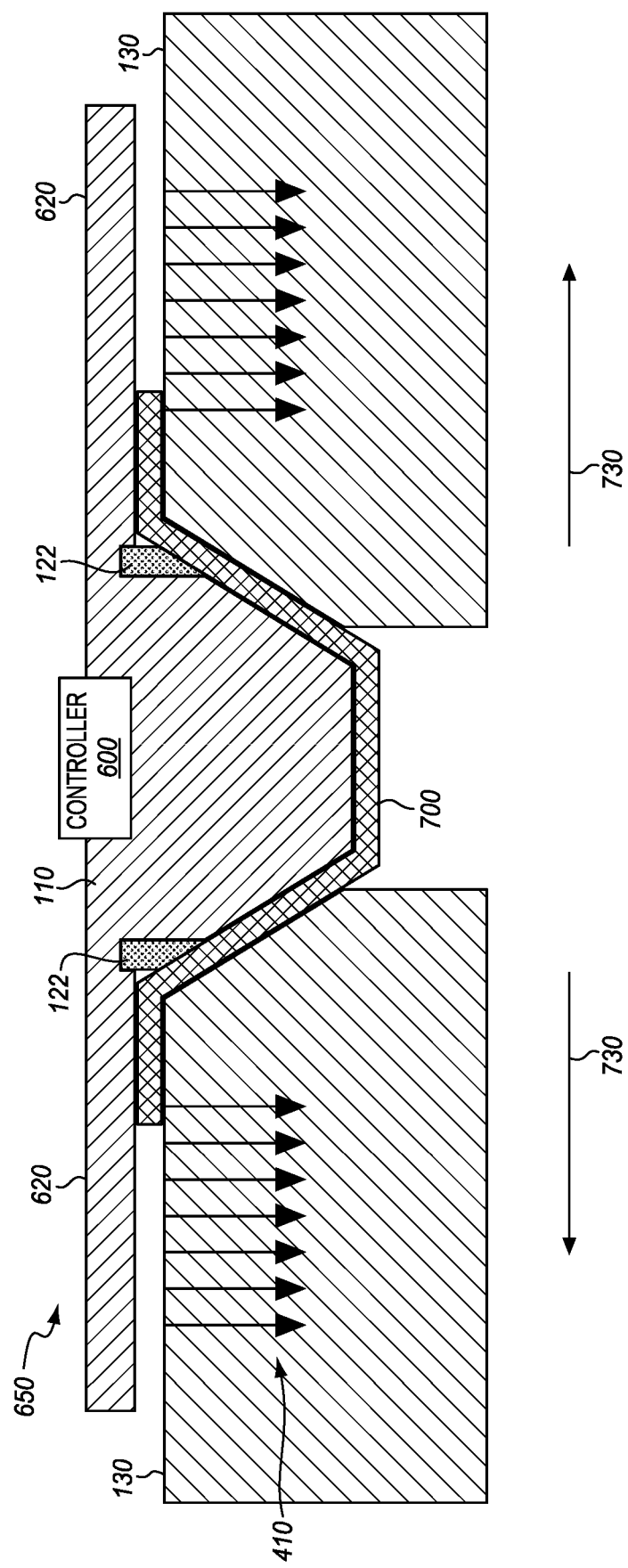

In FIG. 8, the male die 110 has completed shaping/forming of the preform 700. During the forming of the flat charge 120 into the preform 700, gap fillers 122 are retained within notches 114 of the male die 110. In one embodiment, the gap fillers 122 overfill the notches 114 by, for example, ten percent. This ensures that the gap fillers 122 are compressed enough to adhere to the preform 700, without being overly compressed or misshapen. This process keeps enough volume in the gap filler 122 arranged proud relative to the preform 700 (i.e., such that the gap filler 122 extends beyond an upper surface of the preform 700). This geometric arrangement ensures that later vacuum pressure flows the gap filler 122 onto a top of a radius of a bladder. Thus, the notches 114 are protected from being crushed or moved by the forming process. After completion of shaping/forming, the male die 110 may dwell for a period of time to enable built-up, residual shear stress between plies of the preform to be removed or otherwise abate. Specifically, the dwell time allows resin between plies to flow and relax the preform 700. In some embodiments, dwell time is also utilized to compress flanges of the preform 700 in order to consolidate the preform 700.

Figure 9:
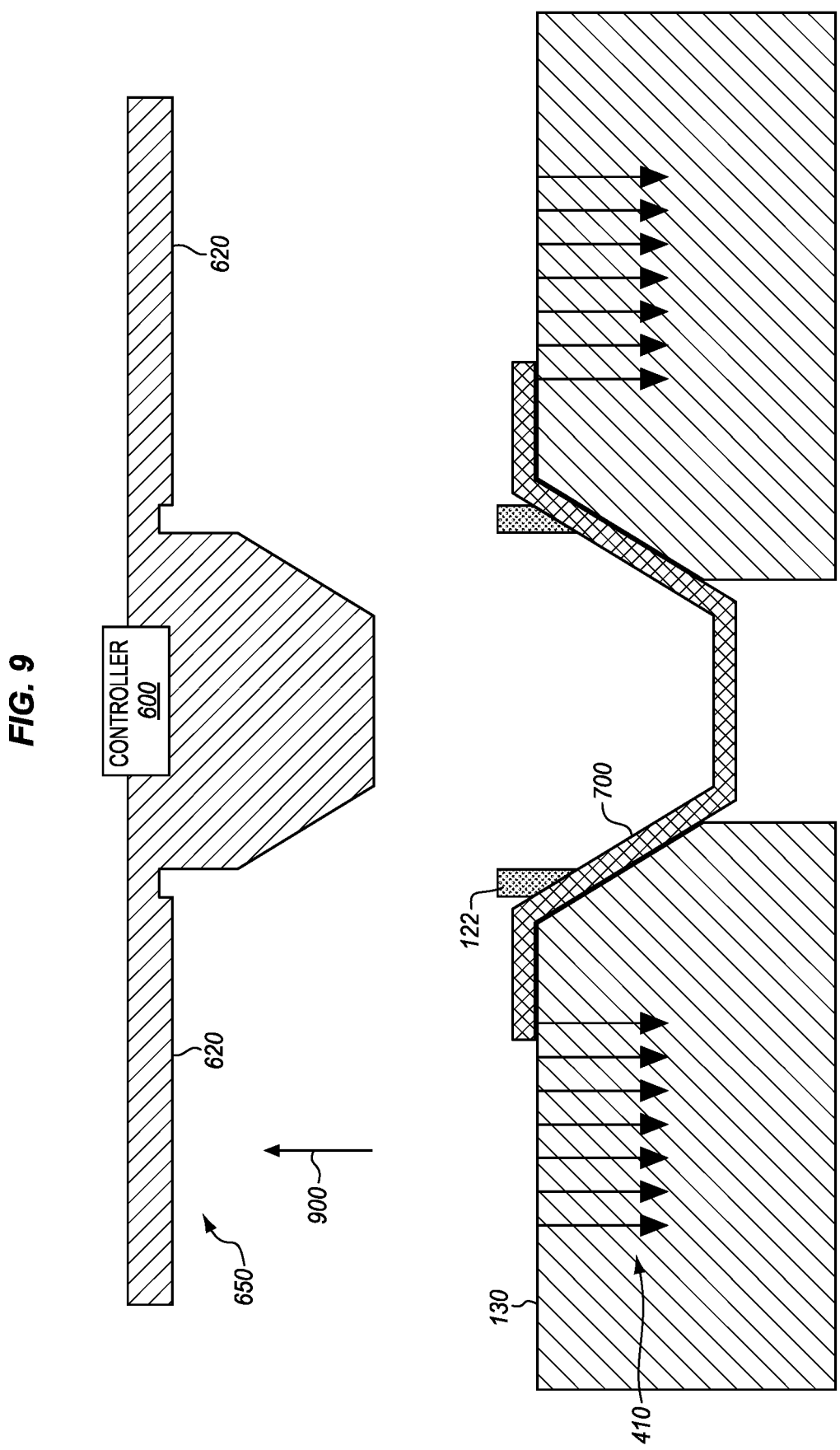

In FIG. 9, the controller 600 retracts the male die 110 in direction 900 while the preform 700 remains supported by female dies 130 and/or feet 620. Because the male die 110 proceeds vertically upwards, the gap fillers 122 retained in the notches 114 do not catch or otherwise bind against the notches 114 as the male die 110 retreats. In FIG. 10A, the preform 700 is transferred to a mandrel 1000 or other rigid tool, in order to prepare for hardening into a composite part.

FIG. 10A depicts a preform 700 disposed at a mandrel 1000 in an illustrative embodiment. In this embodiment, the preform 700 includes corners 1010, at which gap fillers 122 are disposed. The gap fillers 122 stand slightly proud of flanges 1012 of the preform 700, in that they extend beyond the upper surfaces 1014 of the flanges 1012. The preform 700 also exhibits a desired type of shape 710. Thus, the preform 700 is fully formed and ready for integration with a skin preform of an aircraft in order to form a hat stringer or other structural member. Furthermore, a bladder 1040 has been inserted into the preform 700 to support the preform 700 during hardening. In this embodiment, the bladder 1040 sits approximately flush to a top surface of the flanges 1012.

Figure 10B:
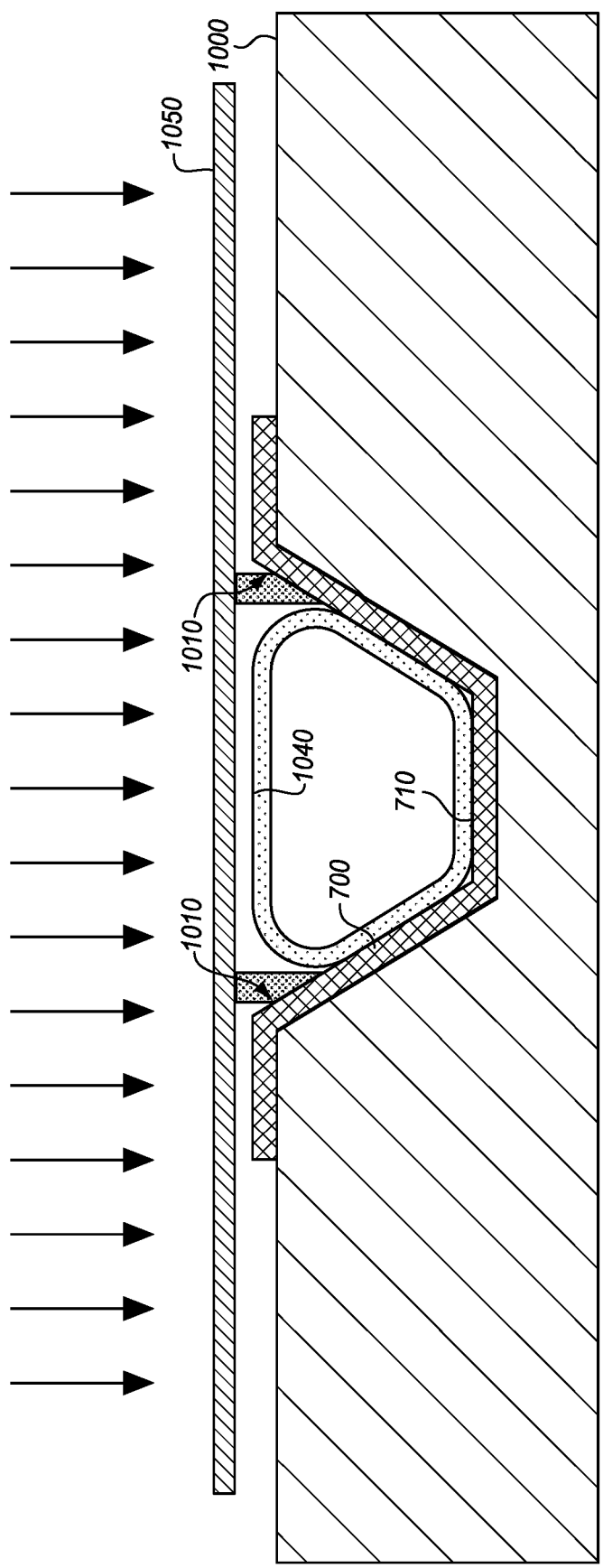
FIG. 10B depicts a skin preform resting atop a preform in an illustrative embodiment.

FIG. 10B depicts a skin preform 1050 resting atop a preform 700 in an illustrative embodiment. As depicted, the skin preform 1050 directly contacts gap fillers 122 at the preform 700. Hence, a weight of the skin preform 1050 or, in further embodiments, a vacuum bag, may press and move the gap fillers 122 in the direction indicated by the arrows, in order to fill corners 1010. A vacuum bag may be utilized in combination with a kitting tray or mandrel, while a skin preform 1050 may be used in combination with a mandrel. During subsequent vacuum or other pressure application processes, the gap fillers 122 act like tent poles supporting the skin preform 1050 (or other material). During pressure application the gap fillers 122 receive higher pressure due to this tent pole effect, which will flow resin into any adjacent lower pressure zones, such as cavities proximate to the bladder 1040.

FIG. 11 depicts a preform 700 ready for hardening in an illustrative embodiment. The preform 700 includes gap fillers 122 that are disposed at corners 1010 and that beneficially provide structural enhancement of the corners 1010 by filling in the corners 1010 and/or increasing a radius of curvature of the corners 1010. The preform 700 may then be co-cured with the skin preform 1050 and gap fillers 122, as well as any layers (not shown) attached to the bladder 1040, in order to form a composite part in the form of a skin panel with integral hat stringers.

With a discussion provided above of the inventive systems and methods for utilizing a male die with notches to accommodate gap fillers, further discussion turns to systems and methods for fabricating flat charges that include gap fillers.

Figure 12:
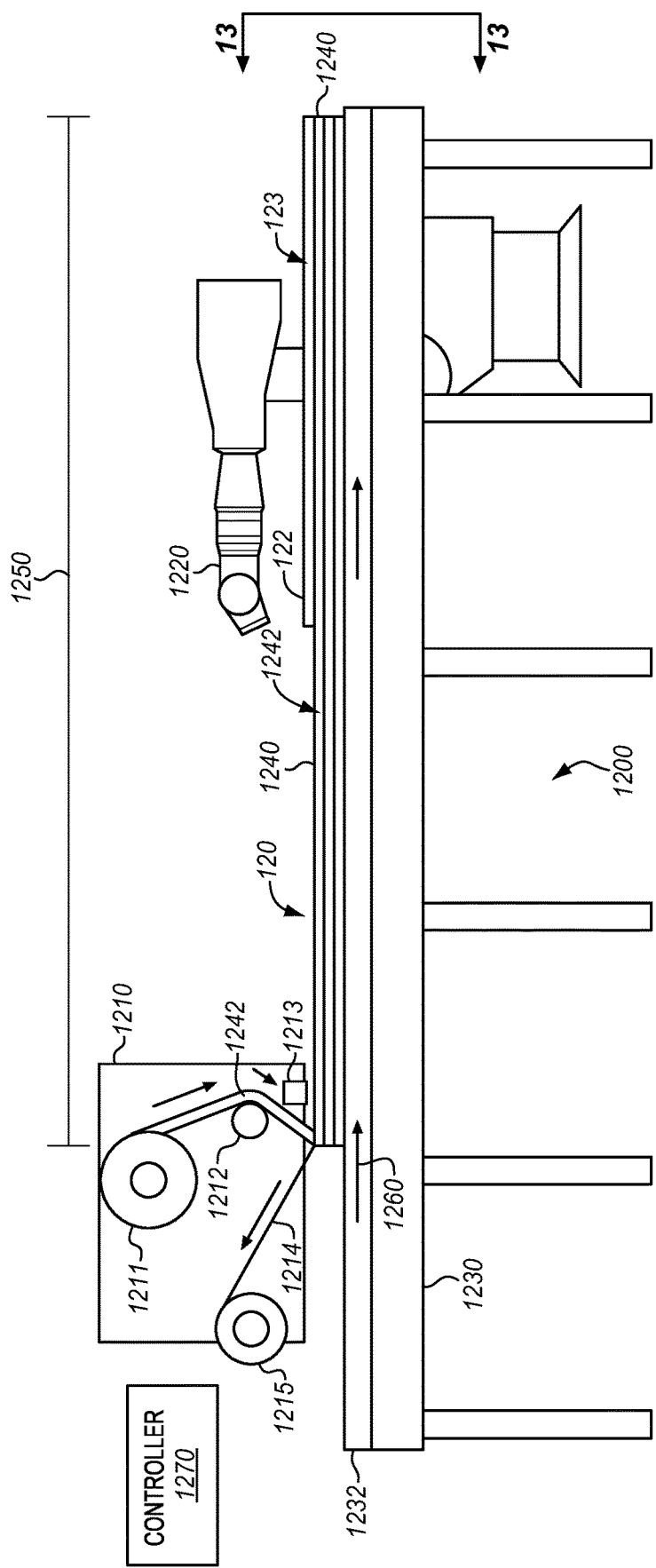
FIG. 12 depicts a system for fabricating a flat charge and dispensing gap fillers onto the flat charge in an illustrative embodiment.

FIG. 12 depicts a system 1200 for fabricating a flat charge 120 and dispensing gap fillers 122 onto the flat charge 120 in an illustrative embodiment. In this embodiment, system 1200 includes a laminator 1210, such as a Flat Tape Layup Machine (FTLM) operating in accordance with an NC program. The laminator 1210 lays up one or more layers 1240 of composite material 1242 at the flat charge 120. In this embodiment, the layers 1240 comprise layers of prepreg woven carbon fiber fabric, although in further embodiments the layers 1240 may comprise layers of unidirectional carbon fiber tape, or other composite materials.

In this embodiment, the laminator 1210 is configured to lay up one or more layers 1240 of the flat charge 120. By laying up the layers 1240 sequentially, a flat charge 120 may be created. Specifically, the laminator 1210 includes a roll 1211 of composite material 1242 such as prepreg. The composite material 1242 proceeds to a redirect roller 1212, which in combination with cutter 1213 proceeds to dispense the composite material 1242 as desired. Backing paper 1214 is separated from the composite material 1242 and proceeds to a backing paper collection roll 1215. The flat charge 120 proceeds in direction 1260 towards one or more robot arms 1220. The robot arm 1220 is configured to dispense (e.g., extrude, pick and place, etc.) gap fillers 122 onto the flat charge 120 at desired widthwise locations 124 as fabrication continues, alone or in coordination with other robot arms 1220. In one embodiment, the robot arm 1220 adheres the gap filler 122 to the flat charge 120 by pressing the gap filler 122 into the flat charge 120. Furthermore, in this embodiment, a majority of the gap filler 122 by weight comprises a curable resin 123. The robot arm 1220 dispenses the gap filler 122 along a length 1250 of the flat charge 120 at the widthwise location 124.

The operations of the laminator 1210 and the robot arm 1220 may be coordinated based on instructions from a controller 1270. For example, controller 1270 may provide instructions defined by an NC program.

Figure 13:
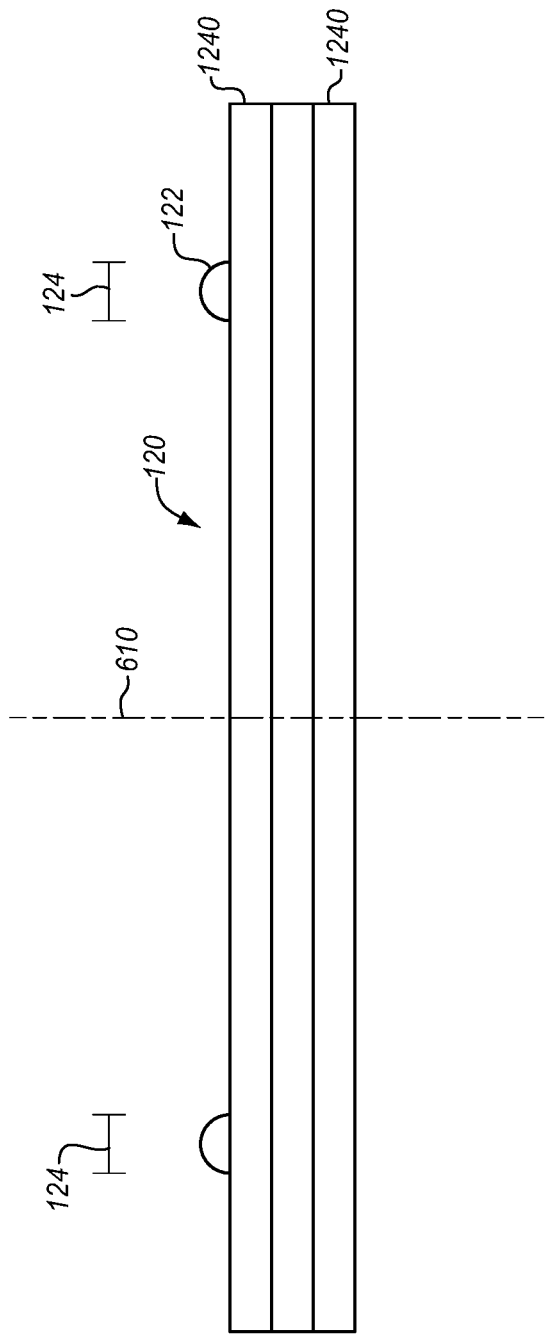
FIG. 13 is a front view of a flat charge that includes dispensed gap fillers in an illustrative embodiment.
Figure 15:
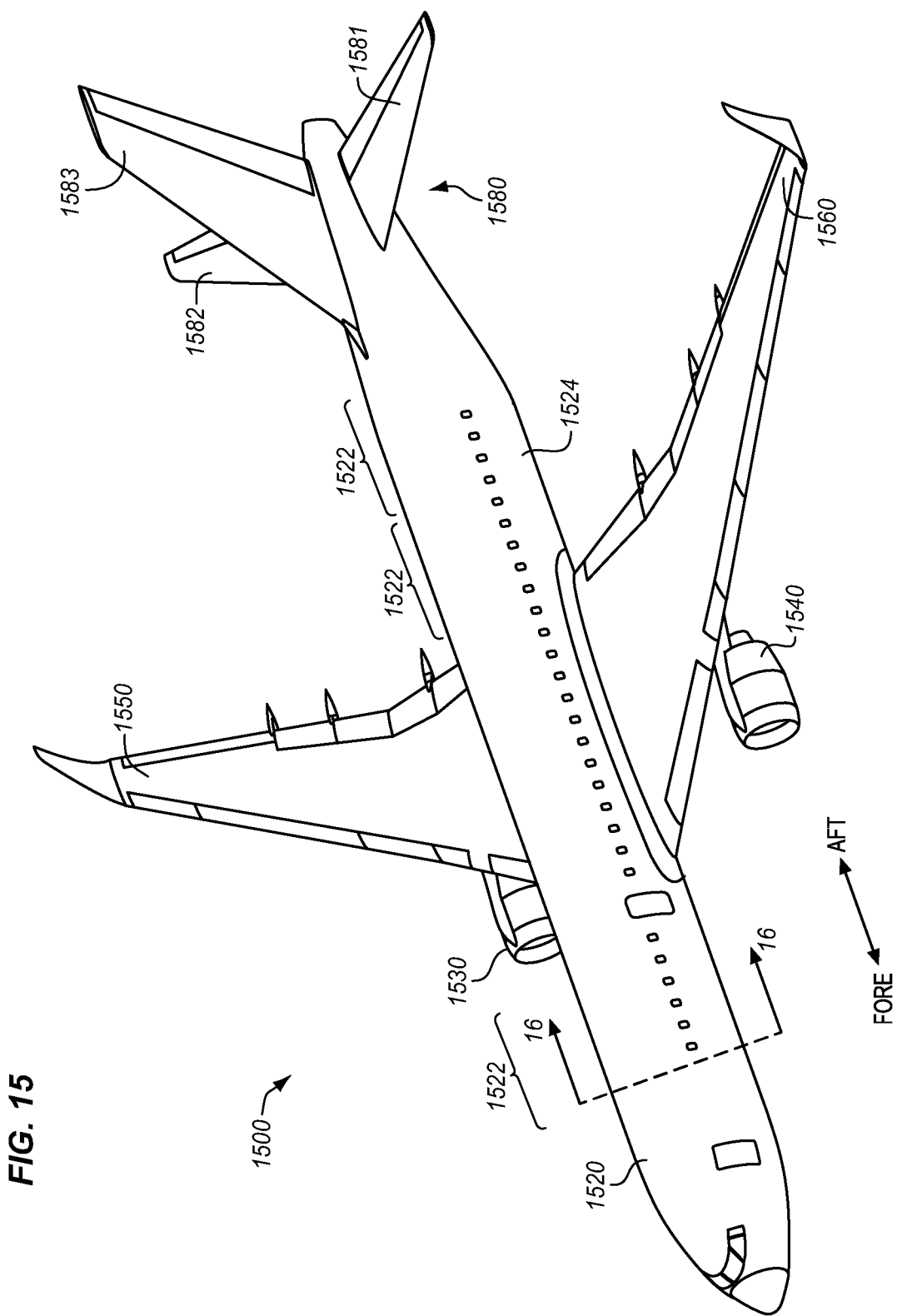
FIG. 15 depicts an aircraft in an illustrative embodiment.

FIG. 13 is a front view of a flat charge 120 that includes gap fillers 122 disposed on a top surface thereof in an illustrative embodiment, and corresponds with view arrows 13 of FIG. 12. In this state, the flat charge 120 is configured for shaping into a preform 700 for a stringer 1620 (FIG. 16) of an aircraft 1500 (FIG. 15).

In FIG. 13, a centerline 610 of the flat charge 120 is depicted. During layup and placement of the gap fillers 122, the widthwise location 124 chosen for a gap filler 122 may be chosen relative to the centerline (e.g., two inches off of the centerline, etc.) in order to facilitate alignment. Layers 1240 are also clearly visible, as are the gap fillers 122.

Figure 14:
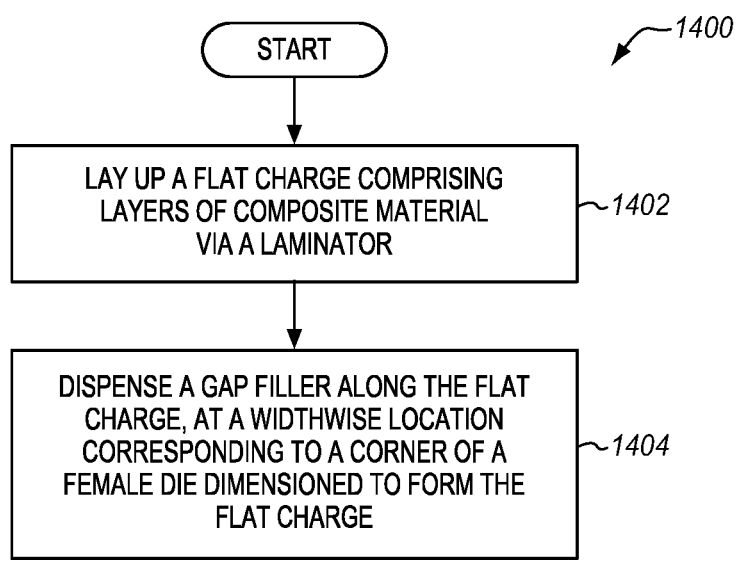
FIG. 14 is a flowchart illustrating a method for fabricating flat charges having dispensed gap fillers in an illustrative embodiment.

FIG. 14 is a flowchart illustrating a method 1400 for fabricating flat charges 120 upon which gap fillers 122 have been dispensed in an illustrative embodiment.

Method 1400 includes laying up, at 1402, a flat charge 120 comprising layers 1240 of composite material 1242 via a laminator 1210. In one embodiment, this comprises operating one or multiple laminators 1210 concurrently in accordance with instructions from an NC program.

Method 1400 further includes, at 1404, dispensing a gap filler 122 along the flat charge 120, at a widthwise location 124 corresponding to a corner 132 of a female die 130 dimensioned to form the flat charge 120 into a preform 700. In one embodiment, controller 1270 coordinates the actions of the laminator 1210 and the robot arm 1220 so that these devices operate concurrently during fabrication. In some embodiments, a conveyance 1232 at a support 1230 proceeds continuously as fabrication proceeds, while in further embodiments, the conveyance 1232 advances and then pauses for predefined periods of time. In embodiments where the conveyance 1232 pauses, the devices may operate during pauses, during movement, or during any other suitable periods.

With a discussion provided above of the fabrication of preforms for use as structural members in an aircraft, further context regarding illustrative aircraft are provided below. The systems and techniques discussed above may be implemented to fabricate any suitable structure of such aircraft.

Turning now to FIG. 15, an illustration of an aircraft 1500 is depicted for which the fabrication systems and methods described herein may be implemented in an illustrative embodiment. In this illustrative example, aircraft 1500 includes wing 1550 and wing 1560 attached to fuselage 1524 having a nose 1520. Aircraft 1500 includes engine 1540 attached to wing 1560 and engine 1530 attached to wing 1550. Tail section 1580 is also attached to fuselage 1524. Horizontal stabilizer 1581, horizontal stabilizer 1582, and vertical stabilizer 1583 are attached to tail section 1580 of fuselage 1524. The fuselage 1524 itself is formed from multiple barrel sections 1522 which have been joined together. In this embodiment, three of barrel sections 1522 are labeled, but any suitable number of barrel sections may be utilized to form the fuselage 1524 as a matter of design choice.

Figure 16:
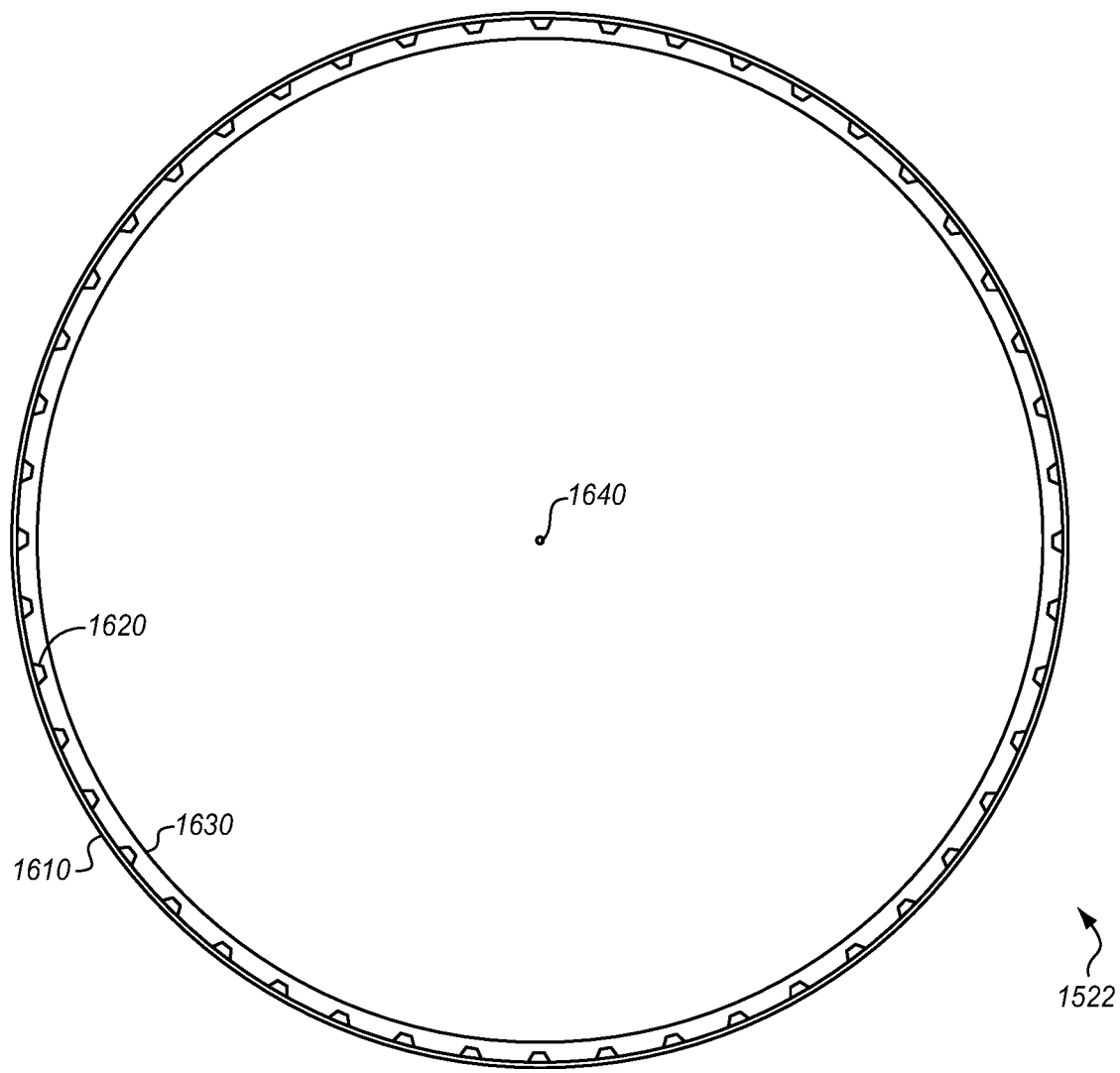
FIG. 16 depicts a barrel section of an aircraft in an illustrative embodiment.

FIG. 16 is a section cut view of a barrel section 1522 of an aircraft 1500 in an illustrative embodiment. In this embodiment, barrel section 1522, is arranged radially about a point 1640, and includes a skin 1610, stringers 1620, and frames 1630. The various techniques discussed above may be applied to measure holes used for fastening any component of an airframe, including barrel section, wings, and other portions of an airframe.

EXAMPLES

In the following examples, additional processes, systems, and methods are described in the context of a forming system for composite parts.

Figure 17:
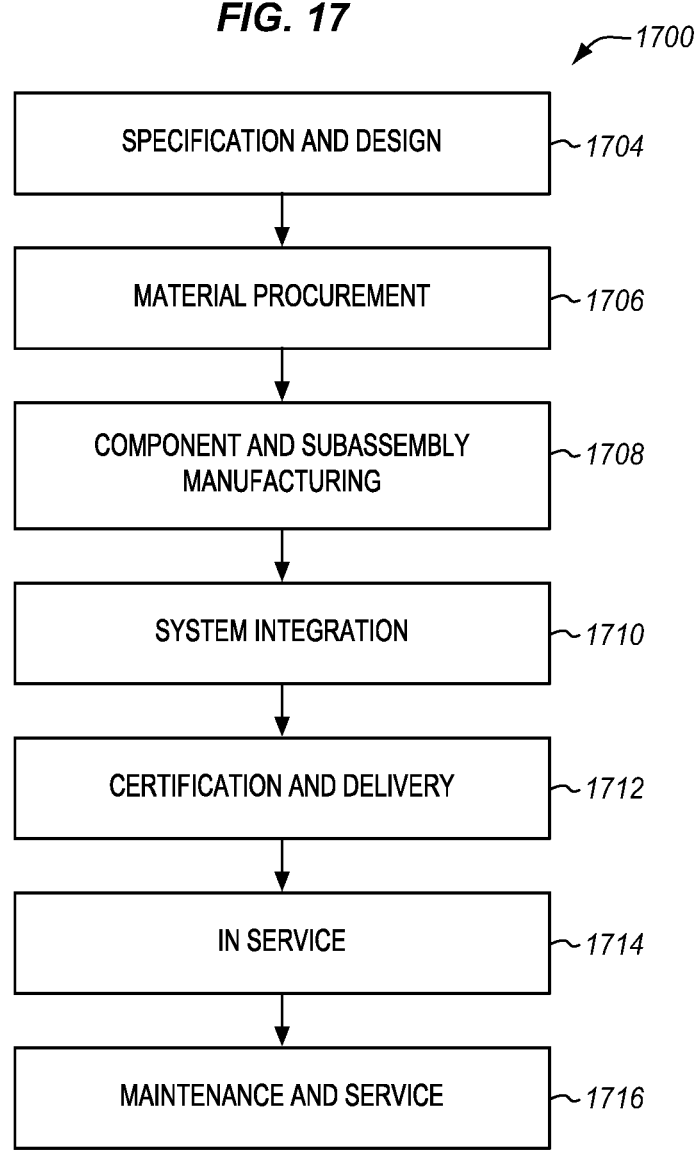
FIG. 17 is a flow diagram of aircraft production and service methodology in an illustrative embodiment.
Figure 18:
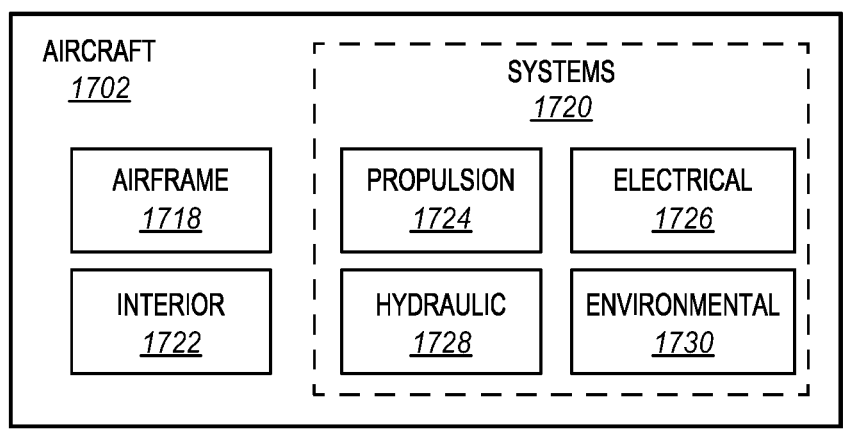
FIG. 18 is a block diagram of an aircraft in an illustrative embodiment.

Referring more particularly to the drawings, embodiments of the disclosure may be described in the context of aircraft manufacturing and service in method 1700 as shown in FIG. 17 and an aircraft 1702 as shown in FIG. 18. During pre-production, method 1700 may include specification and design 1704 of the aircraft 1702 and material procurement 1706. During production, component and subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine work in maintenance and service 1716 (which may also include modification, reconfiguration, refurbishment, and so on). Apparatus and methods embodied herein may be employed during any one or more suitable stages of the production and service described in method 1700 (e.g., specification and design 1704, material procurement 1706, component and subassembly manufacturing 1708, system integration 1710, certification and delivery 1712, service 1714, maintenance and service 1716) and/or any suitable component of aircraft 1702 (e.g., airframe 1718, systems 1720, interior 1722, propulsion system 1724, electrical system 1726, hydraulic system 1728, environmental system 1730).

Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 1702 produced by method 1700 may include an airframe 1718 with a plurality of systems 1720 and an interior 1722. Examples of systems 1720 include one or more of a propulsion system 1724, an electrical system 1726, a hydraulic system 1728, and an environmental system 1730. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1700. For example, components or subassemblies corresponding to component and subassembly manufacturing 1708 may be fabricated or manufactured in a manner similar to components or subassemblies produced while the aircraft 1702 is in service. Also, one or more apparatus embodiments, method embodiments, or a combination thereof may be utilized during the subassembly manufacturing 1708 and system integration 1710, for example, by substantially expediting assembly of or reducing the cost of an aircraft 1702. Similarly, one or more of apparatus embodiments, method embodiments, or a combination thereof may be utilized while the aircraft 1702 is in service, for example and without limitation during the maintenance and service 1716. Thus, the invention may be used in any stages discussed herein, or any combination thereof, such as specification and design 1704, material procurement 1706, component and subassembly manufacturing 1708, system integration 1710, certification and delivery 1712, service 1714, maintenance and service 1716 and/or any suitable component of aircraft 1702 (e.g., airframe 1718, systems 1720, interior 1722, propulsion system 1724, electrical system 1726, hydraulic system 1728, and/or environmental system 1730).

In one embodiment, a part comprises a portion of airframe 1718, and is manufactured during component and subassembly manufacturing 1708. The part may then be assembled into an aircraft in system integration 1710, and then be utilized in service 1714 until wear renders the part unusable. Then, in maintenance and service 1716, the part may be discarded and replaced with a newly manufactured part. Inventive components and methods may be utilized throughout component and subassembly manufacturing 1708 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A forming system for shaping a flat charge, comprising:
   a flat charge having gap fillers disposed atop the flat charge;
   female dies that are elongate and are configured to hold the flat charge; and
   a male die that is elongate and is configured to press into the flat charge between the female dies to form the flat charge while the flat charge is supported, the male die comprising notches that extend along a length of the male die and are dimensioned to retain the gap fillers of the flat charge at widthwise locations of the flat charge corresponding to corners of the female dies while the flat charge is formed,
   wherein the gap fillers of the flat charge are disposed widthwise beyond the notches of the male die, and
   wherein the gap fillers of the flat charge slide widthwise into the notches as the flat charge is pressed between the male die and the female dies.

2. The forming system of claim 1 wherein:
   internal corners within each of the notches are at least ninety degrees.

3. The forming system of claim 1 wherein:
   each of the widthwise locations becomes a corner of a preform after forming of the flat charge has completed.

4. The forming system of claim 1 wherein:
   each notch bridges one of the corners of the female dies.

5. The forming system of claim 1 further comprising:
   feet that pinch the flat charge against the female dies.

6. The forming system of claim 1 wherein:
   the female dies include suction ports configured to apply suction that holds the flat charge during forming of the flat charge.

7. The forming system of claim 1 wherein:
   the male die and the female dies are configured to form the flat charge into at least one shape selected from the group consisting of: a U shape, a trapezoidal shape, and an omega shape.

8. A method for shaping a flat charge, comprising:
   disposing female dies that are elongate and are configured to hold the flat charge at a forming system;
   placing the flat charge at the female dies;
   disposing gap fillers atop the flat charge;
   supporting the flat charge at the female dies;
   pressing a male die that is elongate into the flat charge between the female dies to form the flat charge while the flat charge is supported; and
   retaining the gap fillers atop the flat charge within notches that extend along a length of the male die, at widthwise locations of the flat charge corresponding to corners of the female dies, while the flat charge is formed into a preform,
   wherein the gap fillers atop the flat charge are disposed widthwise beyond the notches of the male die, and
   wherein the gap fillers atop the flat charge slide widthwise into the notches as the flat charge is pressed between the male die and the female dies.

9. The method of claim 8 further comprising:
   inserting a bladder into the preform between the gap fillers.

10. The method of claim 8 wherein:
    placing the flat charge comprises placing layers of composite material.

11. The method of claim 8 further comprising:
    transporting the preform, including the gap fillers, to a mandrel.

12. The method of claim 8 further wherein:
    forming the flat charge comprises enforcing a shape selected from the group consisting of: a U shape, a trapezoidal shape, and an omega shape.

13. The method of claim 8 further comprising:
    placing the preform formed from the flat charge into contact with a skin preform.

14. The method of claim 13 further comprising:
    co-curing the preform to the skin preform.

15. A forming system for shaping a flat charge, comprising: a flat charge configured to receive gap fillers on a top surface of the flat charge; a robot arm controlled to dispense the gap fillers atop the flat charge; female dies that are elongate and are configured to hold the flat charge; and a male die that is elongate and is configured to press into the flat charge between the female dies to form the flat charge while the flat charge is supported, the male die comprising notches that extend along a length of the male die and are dimensioned to retain the gap fillers of the flat charge at widthwise locations of the flat charge corresponding to corners of the female dies while the flat charge is formed, wherein the gap fillers of the flat charge are disposed widthwise beyond the notches of the male die, and wherein the gap fillers of the flat charge slide widthwise into the notches as the flat charge is pressed between the male die and the female dies.

16. The forming system of claim 15 wherein:
a majority of the gap filler by weight comprises a curable resin.

17. The forming system of claim 15 further comprising:
a laminator configured to lay up a layer of the flat charge in coordination with other laminators.

18. The forming system of claim 15 wherein:
the flat charge is configured for shaping into a preform for a stringer of an aircraft.

19. The forming system of claim 15 wherein:
the robot arm adheres the gap filler to the flat charge by pressing the gap filler into the flat charge.

20. The forming system of claim 15 wherein:
the robot arm dispenses the gap filler along a length of the flat charge at the widthwise location.

\* \* \* \* \*